United States Patent
Lee

(10) Patent No.: US 8,711,933 B2
(45) Date of Patent: Apr. 29, 2014

(54) RANDOM ACCESS POINT (RAP) FORMATION USING INTRA REFRESHING TECHNIQUE IN VIDEO CODING

(75) Inventor: Hung-Ju Lee, Pleasanton, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 655 days.

(21) Appl. No.: 12/853,214

(22) Filed: Aug. 9, 2010

(65) Prior Publication Data

US 2012/0033730 A1 Feb. 9, 2012

(51) Int. Cl.
*H04N 7/32* (2006.01)
(52) U.S. Cl.
USPC ............ 375/240.12; 375/240.24; 375/240.13; 375/240.26; 375/240.01
(58) Field of Classification Search
USPC ........... 375/240.12, 240.13, 240.26; 382/254; 386/4
IPC .................. H04B 1/66,11/04, 7/12; H04N 7/32
See application file for complete search history.

(56) References Cited

U.S. PATENT DOCUMENTS

| | | | | |
|---|---|---|---|---|
| 6,463,101 | B1 * | 10/2002 | Koto | 375/240.13 |
| 7,321,621 | B2 * | 1/2008 | Popescu et al. | 375/233 |
| 7,848,428 | B2 * | 12/2010 | Chin | 375/240.16 |
| 2004/0086193 | A1 * | 5/2004 | Kameyama et al. | 382/254 |
| 2005/0147375 | A1 * | 7/2005 | Kadono | 386/4 |
| 2005/0265461 | A1 * | 12/2005 | Raveendran | 375/242 |
| 2007/0025621 | A1 * | 2/2007 | Lee et al. | 382/232 |
| 2007/0297505 | A1 * | 12/2007 | Fidler et al. | 375/240 |
| 2008/0025397 | A1 * | 1/2008 | Zhao et al. | 375/240.13 |
| 2009/0003441 | A1 * | 1/2009 | Sekiguchi et al. | 375/240.13 |
| 2009/0003447 | A1 * | 1/2009 | Christoffersen et al. | 375/240.16 |

* cited by examiner

*Primary Examiner* — Thao Le
*Assistant Examiner* — Long Le
(74) *Attorney, Agent, or Firm* — Joshua D. Isenberg; JDI Patent

(57) ABSTRACT

A random access point can be generated in a stream of coded digital pictures containing a plurality of predictive coded frames in which one or more subsections of each frame are intra coded. A patch frame can be formed from intra-coded subsections in identified consecutive predictive-coded frames. The patch frame can be used as a synthetic random access point.

26 Claims, 6 Drawing Sheets

IDR0  P1  P2  P3  P4  IDR5  P6  P7  P8

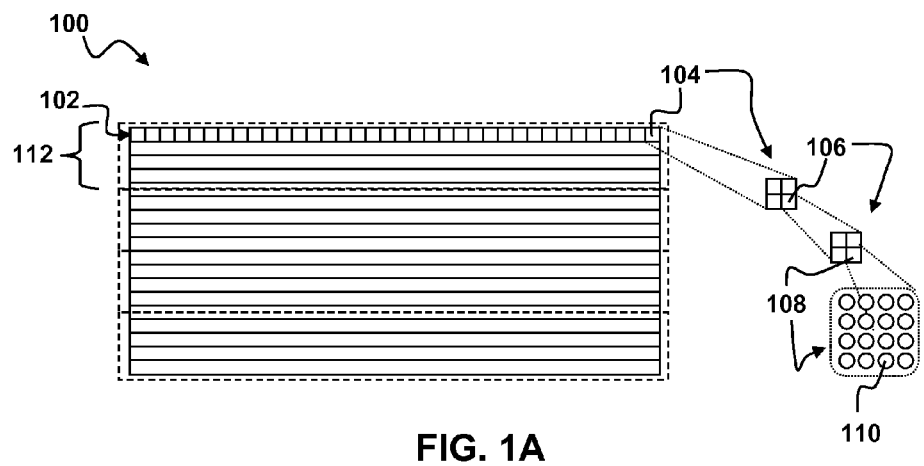
FIG. 1A
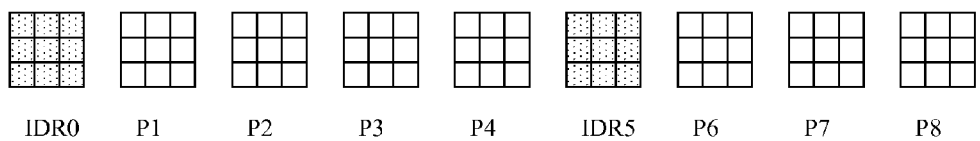
FIG. 1B
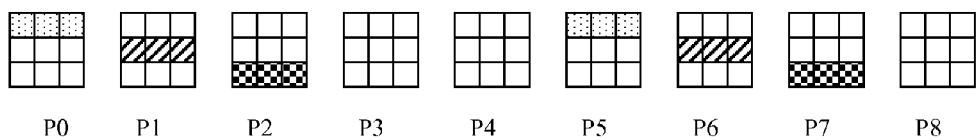
FIG. 1C
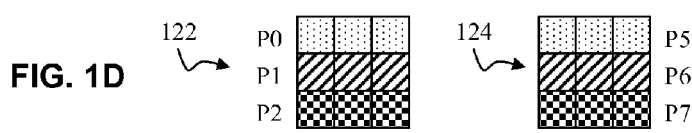
FIG. 1D
FIG. 1E
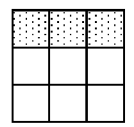   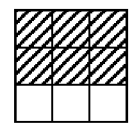   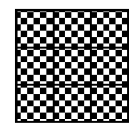
P5             P6             P7

RANDOM ACCESS POINT (RAP) FORMATION USING INTRA REFRESHING TECHNIQUE IN VIDEO CODING

FIELD OF THE INVENTION

Embodiments of the present invention are related to video coding and more specifically to a method and apparatus for implement a new formation of random access point in video encoding.

BACKGROUND OF THE INVENTION

Digital signal compression is widely used in many multimedia applications and devices. Digital signal compression using a coder/decoder (codec) allows streaming media, such as audio or video signals to be transmitted over the Internet or stored on compact discs. A number of different standards of digital video compression have emerged, including H.261, H.263; DV; MPEG-1, MPEG-2, MPEG-4, VC1; and AVC (H.264). These standards, as well as other video compression technologies, seek to efficiently represent a video frame picture by eliminating or reducing spatial and temporal redundancies within a given picture and/or among successive pictures. Through the use of such compression standards, video contents can be carried in highly compressed video bit streams, and thus efficiently stored in disks or transmitted over networks.

MPEG-4 AVC (Advanced Video Coding), also known as H.264, is a video compression standard that offers significantly greater compression than its predecessors. The H.264 standard is expected to offer up to twice the compression of the earlier MPEG-2 standard. The H.264 standard is also expected to offer improvements in perceptual quality. As a result, more and more video content is being delivered in the form of AVC(H.264)-coded streams. Two rival DVD formats, the HD-DVD format and the Blu-Ray Disc format support H.264/AVC High Profile decoding as a mandatory player feature. AVC(H.264) coding is described in detail in ISO/IEC 14496-10:2009, "Information technology—Coding of audiovisual objects—Part 10: Advanced Video Coding, Edition 5" May 13, 2009, which is incorporated herein by reference. A copy may be downloaded at the following URL: http://www.iso.org/iso/iso_catalogue/catalogue_tc/catalogue_detail.htm?csnumber=52974.

Many codecs make use of different types of coding of frames. Examples of different frame coding formats include Intra-coded frames (I-frames), predictive coded frames (P-frames) and bi-predictive coded frames (B-frames). In general terms, an I-frame is coded without reference to any other frame. An I-frame can be decoded independent of the decoding of any other frames. I-frames may be generated by an encoder to create a random access point that allows a decoder to start decoding properly at the location of the I-frame. I-frames generally require more bits to encode than P-frames or B-frames.

P-frames are coded with reference to one or more other frames, such as an I-frame or another P-frame. A P-frame contains changes in the image from one or more previous frames. Decoding a P-frame requires the previous decoding of one or more other frames. P-frames require fewer bits to encode than I-frames. B-frames are similar to P-frames but contain image differences with respect to both previous and subsequent frames. B-frames can be coded in some prediction modes that form a prediction of a motion region within the frame by averaging the predictions obtained using two different previously-decoded reference regions. B-frames require fewer bits to encode than I-frames or P-frames.

The coding of video streams into bitstreams that contain I-frames for transmission over the Internet is subject to certain problems. One problem is compression delay. Even though an I-frame typically requires more bits than a P-frame or B-frame it takes more time to compress and encode a video image as a P-frame or B-frame than as an I-frame. Another problem is referred to as bit-rate jitter. Because I-frames consume much more bit counts than P-frames or B-frames, the bit rate for producing encoded pictures is uneven. It would be more desirable to have a smoother bit rate.

To overcome the compression delay and bit-rate problems it would be desirable to eliminate the use of I-frames in video coding. 1. Intra Refresh (IR):

Intra Refresh (IR) technique was first introduced in early video codecs, such as MPEG-1 and MPEG-2. Intra Refresh is a well-known and well-developed encoding feature for providing error resilience in transmitting compressed video contents over error-prone network environments. The basic idea is to forcefully assign an INTRA mode to some macroblocks in inter-predicted pictures (e.g., P-frames) in a way that each macroblock in the picture will be encoded as an INTRA macroblock at least once to confine error propagation if errors occur. Another benefit of employing this technique is that it codes all video frames as P-frames, which alleviates bit rate fluctuations resulting from different types of coding pictures. Coding all video pictures as P-frames also allows for reduction in the buffer size requirement.

In the latest H.264/AVC video coding standard, new features were introduced that enhanced error resiliency. The features included Arbitrary Slice Ordering (ASO) and Flexible Macroblock Ordering (FMO). A slice refers to some sub-unit of a picture having two or more macroblocks, often from a common row of macroblocks. Previously, slices had to be received in a particular order to be properly decoded. ASO allowed for decoding of slices received in arbitrary order. By combining Arbitrary Slice Order (ASO) with Flexible Macroblock Order (FMO), further enhancement of error resilience is provided.

From the viewpoint of the H.264/AVC specification, the intra refreshing technique provides certain benefits. With cyclic INTRA mode assignment, buffering delay is expected due to buffer size reduction. With cyclic INTRA mode assignment, I or IDR picture types might be removed, resulting in more uniform bit count distribution. Error resilience with or without ASO and FMO and error recovery is enhanced, resulting in better picture quality if errors occur.

However, there are certain disadvantages to IR. One disadvantage is that a certain amount of compression loss is expected. This is especially true for the case that the INTRA mode is improperly assigned, which can cause large compression loss particularly for those macroblocks with content that is complex but easily predicted. Furthermore, if IR is combined with ASO & FMO, a one frame delay is needed to extract the macroblock ordering information before starting decoding macroblock information. In addition, it is difficult to implement a random access point with intra refresh because there is no completely clean entry point, such as an I-frame, as is used for Instantaneous Decoder Refresh (IDR) in the H.264 codec.

From the viewpoint of video encoding/delivery applications, the IR technique can provide certain benefits. When IR is combined with ASO and FMO, an encoder can do a better job in region of interest (ROI) coding. The IR technique can also enhance error resilience when combined with ASO and FMO. The delivered visual quality is significantly improved if proper error recovery/concealment is enabled at the decoder side.

If only INTRA macroblocks are allowed (and I-frames are not allowed), the network jitter due to the more uniform picture types is diminished, and a "constant" bits per frame scenario is possible, the buffer size may be reduced significantly.

Intra Refresh does not allow for easy definition of a random access point within a coded video stream. A random access point is quite crucial for some video applications, such as error resiliency. Furthermore, certain VCR-like functionality (e.g., fast forward and fast rewind) cannot be implemented in an IR-coded video stream due to the lack of a clean entry point for these functions. To do fast forward or fast rewind with a coded video stream it is desirable for the coding of each macroblock in a given frame to be independent of the coding of other macroblocks in the same frame. One could implement fast forward or fast rewind without a random access point if the coded video stream included I-frames. However, the use of I-frames in the coded video stream is disadvantageous for the reasons noted above.

It is within this context that embodiments of the present invention arise.

BRIEF DESCRIPTION OF THE DRAWINGS

The teachings of the present invention can be readily understood by considering the following detailed description in conjunction with the accompanying drawings, in which:

FIG. 1A is a schematic diagram illustrating one possible division of a streaming data picture within the context of embodiments of the present invention.

FIG. 1B is a schematic diagram illustrating a stream of coded digital pictures including frames that can be used as random access points.

FIG. 1C-FIG. 1D are schematic diagrams illustrating formation of a synthetic random access point or intra-coded frame from plural predictive coded frames containing intra-coded sections.

FIG. 1E is a schematic diagram illustrating use of a synthetic random access point in decoding pictures.

DESCRIPTION OF THE SPECIFIC EMBODIMENTS

Figure 1F:
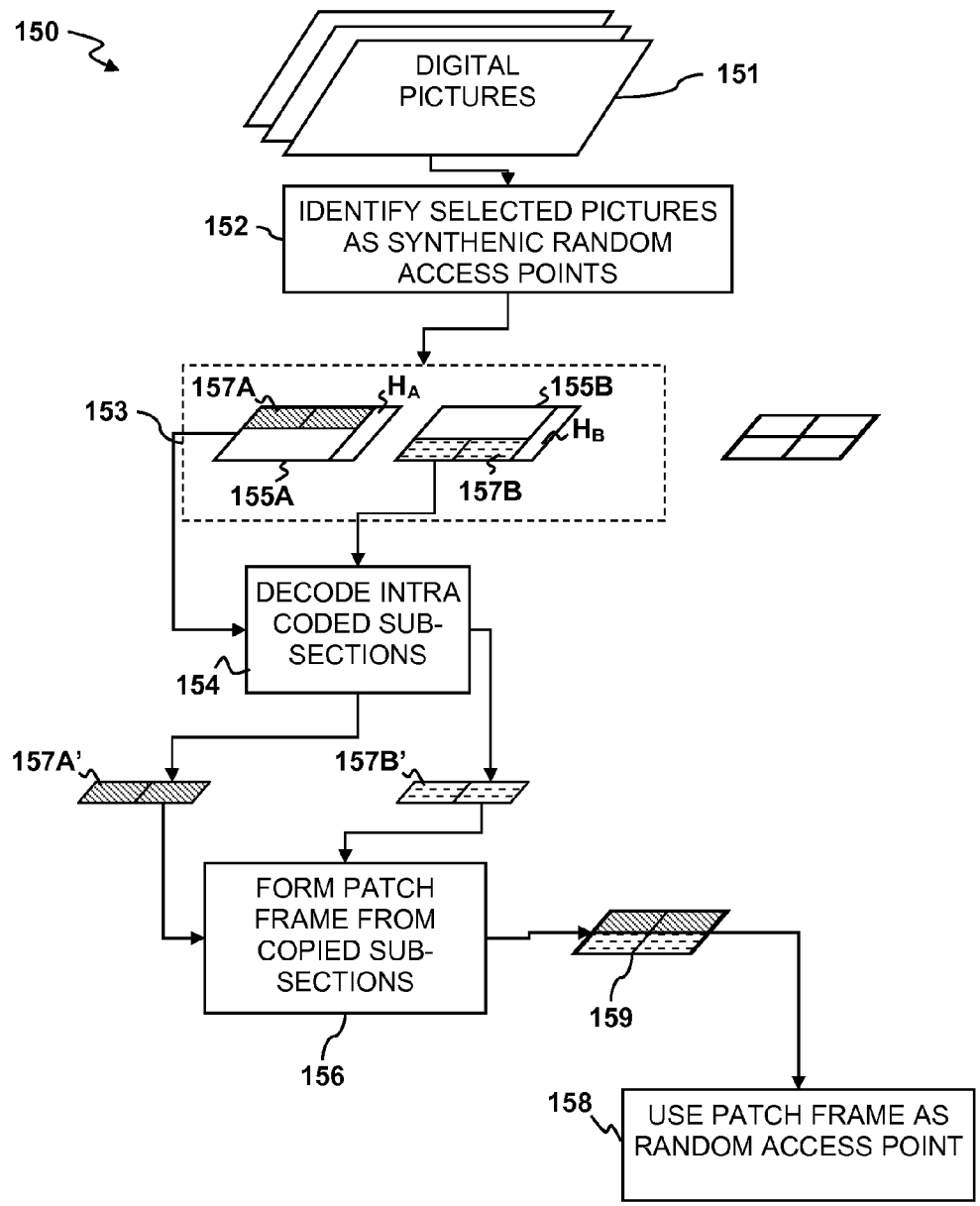
FIG. 1F is a flow diagram illustrating a method of forming a patch frame that can be used as a synthetic random access point in accordance with an embodiment of the present invention.

Embodiments of the present invention implement a new formation of random access point in video encoding, and its application in video trick play provided that only intra-refreshing technique is used in video encoding modes in which I-frame type coding is not allowed (e.g., IDR picture type in AVC/H.264 video coding standard). This technique can also be used where I-frame type coding is allowed but is done relatively infrequently within a stream of coded pictures.

According to embodiments of the present invention, a random access point can be generated within a stream of coded video images without requiring coding of a digital image in the stream as an I-frame or random access point. The stream can contain a plurality of predictive coded frames (P-frames) in which one or more subsections of each frame are intra coded. Intra-coded subsections from different portions of two or more of the predictive-coded frames in the stream can be copied and a synthetic I-frame or random access point, referred to herein as a "patch" frame can be formed at the decoder side from the copied intra-coded subsections. Alternatively, such patch frames may be created by a decoder to generate a random access point when a random access point is needed, e.g., fast forwarding picture frames.

In the context of embodiments of the present invention, streaming data may be broken down in suitable sized units for coding and decoding. For example, in the case of streaming video data, the streaming data may be broken down into pictures with each picture representing a particular image in a series of images. In the case of streaming audio data, the streaming data may be broken down into a series of audio frames with each audio frame representing sound over some predetermined time window. Each unit of streaming data may be broken down into sub-units of varying size. Generally, within each unit there is some smallest or fundamental sub-unit. For example, in the case of streaming audio, an audio frame may be broken down into smaller sized units that depend on a sample rate used to digitize an analog audio signal. The smallest sized unit might be a single audio sample, which may represent a sound level at a specific instant in time. In the case of streaming video, each video frame may be broken down into pixels, each of which contains chrominance (color) and luminance (brightness) data. Although the following discussion is directed to applications related to streaming video, those skilled in the art will recognize that the techniques described below can also be applied to other forms of streaming data, such as streaming audio, and the like.

By way of example, and not by way of limitation, as shown in FIG. 1A, a single picture 100 (e.g., a digital video frame) may be broken down into one or more sections. As used herein, the term "section" can refer to a group of one or more pixels within the picture 100. A section can range from a single pixel within the picture, up to the whole picture. Non-limiting examples of sections include slices 102, macroblocks 104, sub-macroblocks 106, blocks 108 and individual pixels 110. As illustrated in FIG. 1A, each slice 102 contains one or more rows of macroblocks 104 or portions of one or more such rows. The number of macroblocks in a row depends on the size of the macroblocks and the size and resolution of the picture 100. For example, if each macroblock contains sixteen by sixteen pixels then the number of macroblocks in each row may be determined by dividing the width of the picture 100 (in pixels) by sixteen. Each macroblock 104 may be broken down into a number of sub-macroblocks 106. Each sub-macroblock 106 may be broken down into a number of blocks 108 and each block may contain a number of pixels 110. By way of example, and without limitation of the invention, in a common video coding scheme, each macroblock 104 may be broken down into four sub-macroblocks 106. Each sub-macroblock may be broken down into four blocks 108 and each block may contain a four by four arrangement of sixteen pixels 110.

Conventionally, streaming video images have been decoded using a single thread for the decoding of each picture or the decoding of each slice. In a conventional single-thread decoder all decoding tasks for one macroblock are completed before decoding the next macroblock. Multithreaded picture decoding—i.e., decoding multiple pictures in parallel, may also be done. To facilitate multi-threaded decoding within pictures, each picture 100 may be broken down into two or more sections 112 that encompass one or more slices. In embodiments of the present invention it is possible for a slice 102 to "straddle" the boundary between to adjacent sections 112. Thus, a slice may be shared between two different sections.

It is noted that each picture may be either a frame or a field. A frame refers to a complete image. A field is a portion of an image used for to facilitate displaying the image on certain types of display devices. Generally, the pixels in an image are arranged in rows. To facilitate display an image may sometimes be split by putting alternate rows of pixels into two different fields. The rows of pixels in the two fields can then be interlaced to form the complete image. For some display devices, such as cathode ray tube (CRT) displays, the two fields may simply be displayed one after the other in rapid succession. The afterglow of the phosphors used in the CRT screen combined with the persistence of vision results in the two fields being perceived as a continuous image. For other display devices, such as liquid crystal displays, it may be necessary to interlace the two fields into a single picture before being displayed. Streaming data representing encoded images typically includes information indicating whether the image is a field or a frame. Such information may be included in a header to the image. Embodiments of the present invention allow a video codec to find redundancies within a currently processing picture without having to break the picture into fields.

FIG. 1B depicts a conventional stream of coded pictures that includes I-frames IRD0, IDR5 and P-frames P1, P2, P3, P4, P6, P7, P8. For the purposes of example, each picture in the stream is broken down into nine subsections arranged in three rows of three subsections each. In this example, I-frames IDR0 and IDR5 are encoded in a manner that allows them to be decoded without reference to any subsection in any of the other frames in the stream. P-frames P1, P2, P3, P4 are encoded with reference to I-frame IDR0. It is noted that frame P2 could be coded with respect to frame P1, and so on. In a like manner, P-frames P6, P7, P8 can be encoded with respect to I-frame IDR5.

As noted above, some codecs, such as H.264, include an encoding mode that allows some, but not necessarily all, subsections of a picture to be encoded independent of any subsections in any other picture. Specifically, some macroblocks (referred to herein as intra-coded macroblocks) in a picture can be encoded with reference to other macroblocks in the picture but without reference to any macroblocks in any other picture. It is noted that the intra-coded macroblocks can be encoded with reference to other macroblocks within the same picture. For example, the coding of an intra-coded macroblock may depend on to or left neighbor macroblocks, if these exists. In this mode, it is possible to encode a stream of pictures as P-frames without having to encode any picture as an I-frame.

FIG. 1C illustrates an example of encoding a portion of a stream of pictures without the use of I-frames. In this example, frames P0, P1, P2, P3, P4, P5, P6, P7, and P8 are all coded as P-frames. In frame P0 the three subsections in the top row are intra-coded, i.e., encoded without reference to any subsection in any other picture. The intra-coded subsections in frame P0 may, however, be coded with respect to other subsections with frame P0. The remaining sections of frame P0 can be encoded with reference to some previous picture in the stream. In frame P1, the three subsections in the top and bottom rows can be encoded with reference to corresponding subsections in the top and bottom rows of frame P0. The subsections in the middle row of frame P1 can be encoded independent of any subsection in any other picture in the stream. In frame P2, the subsections in the top and middle rows can be encoded with reference to the corresponding subsections in the corresponding rows of frame P1. Frames P3 and P4 contain no intra-coded subsections. However, the subsections in frame P3 can be encoded with reference to corresponding subsections in frame P2 and frame P4 may be similarly encoded with respect to frame P3.

Because the picture stream depicted in FIG. 1C lacks I-frames it can be coded with less bit-rate fluctuation than the stream depicted in FIG. 1B. However, without an I-frame (or IDR frame) the stream depicted in FIG. 1C lacks a random access point for the decoder. In an embodiment of the present invention, this disadvantage can be overcome by forming a synthetic I-frame or "patch" frame on the decoder side from intra-coded subsections from two or more different P-frames in the stream that have been identified by the encoder as being suitable for this purpose. FIG. 1D illustrates an example of how this may be done.

As shown in FIG. 1D, a patch frame 122 can be formed using the top three subsections of frame P0, the middle three subsections of frame P1 and the bottom three subsections of frame P2. Specifically, after the top three subsections of frame P0 have been intra-coded they can be copied to the top row of the patch frame 122. In a like manner the intra-coded middle three subsections of frame P1 and the bottom three intra-coded subsections of frame P2 can be copied to the patch frame 122 after these subsections have been intra coded. In a like manner, a second patch frame 124 can be formed from the intra-coded top row of frame P5, middle row of frame P6, and bottom row of frame P7. The patch frame 122 can be inserted into the stream of pictures to be decoded between frames P2 and P3. The patch frame 124 could be inserted into the stream between frames P7 and P8.

To perform fast forward (FF) or fast backward (FB), the decoder can locate the starting frame corresponding to a patch frame. For example, as seen in FIG. 1E, if patch frame 122 is used to define the random access point, the decoder can obtain the three top subsections of frame P5, from the patch frame 122 and then decode the three top subsections of frame P6 by referring to the three top subsections of frame P5. The decoder can obtain the middle three intra-coded subsections of frame P6 from the patch frame 122 and independently decode them. The top and middle subsections of P6 can be used as references for decoding the top and middle rows of frame P7. The three bottom subsections of frame P7 can be decoded independently since they are intra-coded. Then the frame to be displayed can be either the patched frame 122 or the frame P7 since all of its macroblocks are decoded.

In alternative embodiments, a decoder may similarly construct patch frames as needed from two or more P frames to provide random access points for error resilience between I-frames in a conventional codec, such as H.264.

When a random access point is needed, e.g., fast backward, the decoder can scan back the bit stream containing frames P0 through P8, and find a random access point (e.g., by reading the value of a header bit of frame P0 and/or frame P5). A patch frame can then be formed, e.g., by decoding the first subsection row in frame P5, and the second subsection row in frame P6 and the third subsection row in frame P7.

It is noted that embodiments of the present invention are not limited to implementations in which a patch frame is assembled from complete rows of two or more P-frames. A patch frame could be formed from any combination of intra-coded subsections from two or more different P-frames. For example, portions of rows of different P-frames could be interleaved to make a synthetic I-frame. Alternatively, intra-coded subsections could be interleaved in a checkerboard pattern in which alternating inter-coded subsections from two or more different P-frames are interleaved to form the patch frame.

The number of frames used to form a patch frame can be determined experimentally from a tradeoff between bit rate smoothness and picture quality. A smoother bit rate generally comes at the expense of some degree of loss in picture quality. Using more P-frames to form the patch frame tends to result in a smoother bit rate but poorer picture quality. Using fewer P-frames to form the patch frame tends to result in better picture quality but less bit rate smoothness. A compromise can be made according to specific application requirements.

A patch frame for use as a synthetic random access point may be formed according to the method 150 illustrated in FIG. 1F. Generally, as indicated at 152 an encoder or a decoder identifies two or more consecutive predictive coded pictures containing intra-coded subsections (e.g., macroblocks, slices, etc.) that can be used to form a patch frame from a coded digital picture stream. In some embodiments, the subsections used to form the patch frame may be identified in a coded stream received by a device that includes a decoder. In such a case, it is not necessary for the receiving device to encode the pictures since the pictures are already encoded.

Furthermore, it is not necessary for an encoder to form and transmit the patch frame. Instead, the encoder may simply identify two or more consecutive P-frames that a decoder can use to form the patch frame, e.g., by setting a bit in a header of the bit stream containing the coded P-frames. Once the appropriate header bits have been set the encoder can send or store the bit stream in the normal fashion.

A decoder can identify the two or more consecutive P-frames, e.g., from metadata encoded into the bit stream. When the decoder needs a random access point it can scan forward or backward through the encoded bit stream to identify two or more consecutive P-frames (e.g., by reading the header bits) that it can use to form the patch frame. Once the decoder knows which P-frames to use it can decode the intra-coded subsections from those P-frames and form the patch frame from the resulting decoded subsections.

By way of example, and not by way of limitation, digital pictures 151 may be encoded according to a standard codec to form a coded picture stream 153. The coded picture stream 153 includes coded pictures 155A, 155B that include at least some intra-coded subsections 157A, 157B. The encoder can ensure the intra-coded subsections 157A, 157B can be used to form a patch frame, e.g., by appropriately setting header bits in headers $H_A$, $H_B$ of coded pictures 155A, 155B. The coded pictures 155A, 155B can then be transmitted to an encoder.

By way of example, and not by way of limitation, the encoder may have a periodic INTRA subsection coding mode setting according to which, the encoder intra-codes certain subsections of certain consecutive frames within a stream (e.g., the first 5 frames from every 30 frames) in a known pattern such that the decoder can use these consecutive frames to form the patch frame. The encoder simply needs to encode the bit stream with enough information to allow the decoder to determine which frames to use. To accomplish this, the encoder may add a bit to one or more reserve fields in the bit stream to signal the decoder that the bit stream contains frames encoded in this fashion.

For example, consider a simple case wherein the intra-subsection coding mode codes the first three frames of every five are encoded as described above with respect to FIG. 1C. The encoder can identify this information by setting a bit in headers of frames P0 or P5 to a predetermined value. Assuming the intra subsection coding pattern and the meaning of the predetermined value are known to the decoder, the decoder can identify the appropriate frames and intra-coded sections by reading the bits in the headers of frames P0 or P5.

As indicated at 154, the decoder can use the identified intra coded subsections 157A, 157B from different coded pictures 155A, 155B to form a random access point as needed. A patch frame may then be formed by decoding the intra-coded subsections 157A, 157B and combining them into a patch frame 159 as indicated at 156. The patch frame 159 may be formed as discussed above with respect to FIGS. 1C-1E. The decoder can then use the patch frame 159 as a random access point in the same way as a regular I-frame.

Figure 2A:
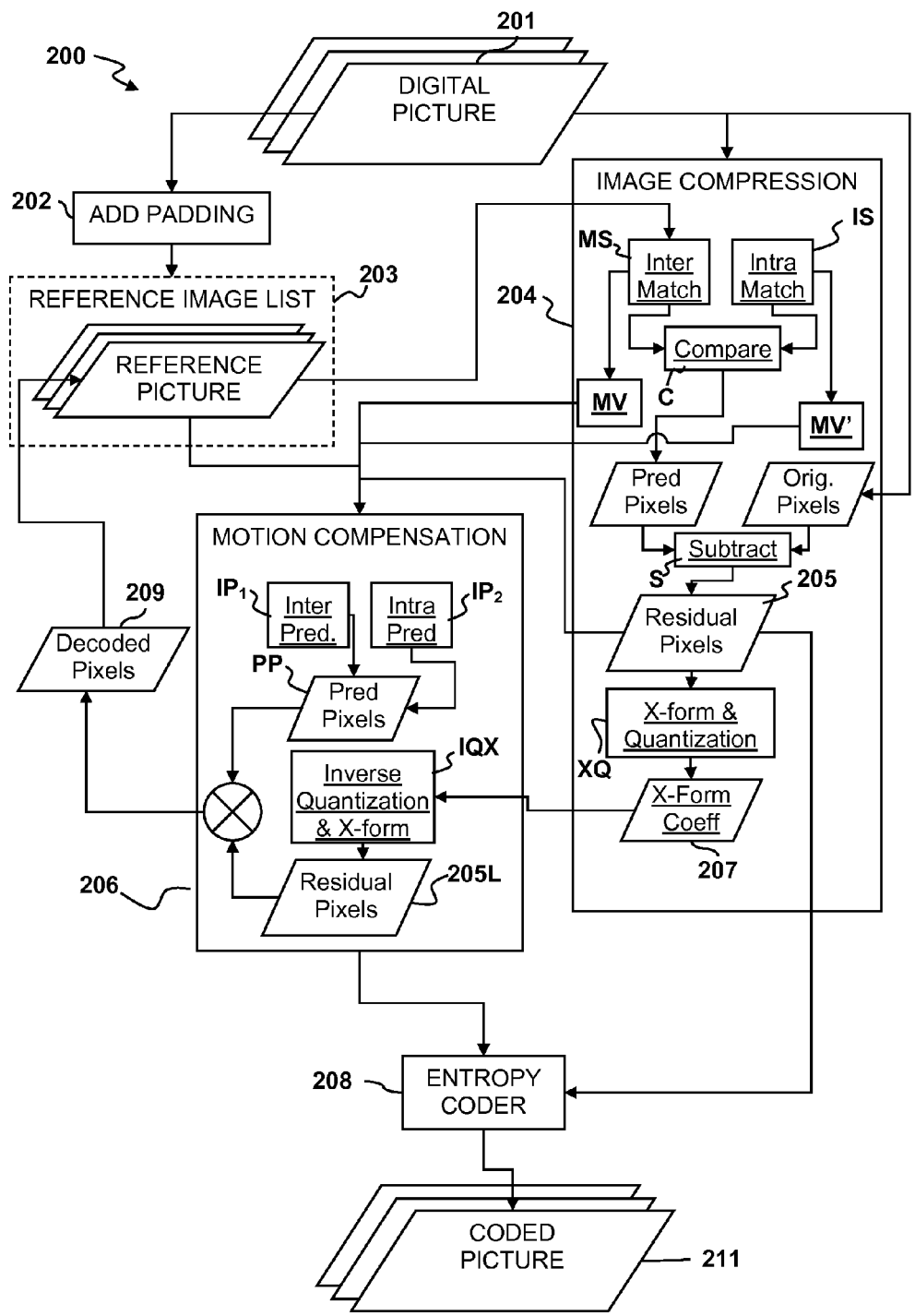
FIG. 2A is a flow diagram illustrating digital picture encoding that may be used in conjunction with embodiments of the present invention.

By way of example, and not by way of limitation, digital pictures may be encoded according to a generalized method 200 as illustrated in FIG. 2A. The encoder receives a plurality of digital images 201 and encodes each image. Encoding of the digital picture 201 may proceed on a section-by-section basis. The encoding process for each section may optionally involve padding 202, image compression 204 and motion compensation 206. To facilitate a common process flow for both intra-coded and inter-coded pictures, all un-decoded pixels within a currently processing picture 201 are padded with temporary pixel values to produce a padded picture, as indicated at 202. The padding may proceed, e.g., as described above with respect to FIG. 1B through FIG. 1E. The padded picture is added to a list of reference pictures 203 stored in a buffer. Padding the picture at 202 facilitates the use of the currently-processing picture as a reference picture in subsequent processing during image compression 204 and motion compensation 206. Such padding is described in detail in commonly-assigned U.S. patent application Ser. No. 12/210, 925, which is incorporated herein by reference.

As used herein, image compression refers to the application of data compression to digital images. The objective of the image compression 204 is to reduce redundancy of the image data for a give image 201 in order to be able to store or transmit the data for that image in an efficient form of compressed data. The image compression 204 may be lossy or lossless. Lossless compression is sometimes preferred for artificial images such as technical drawings, icons or comics. This is because lossy compression methods, especially when used at low bit rates, introduce compression artifacts. Lossless compression methods may also be preferred for high value content, such as medical imagery or image scans made for archival purposes. Lossy methods are especially suitable for natural images such as photos in applications where minor (sometimes imperceptible) loss of fidelity is acceptable to achieve a substantial reduction in bit rate.

Examples of methods for lossless image compression include, but are not limited to Run-length encoding—used as default method in PCX and as one of possible in BMP, TGA, TIFF, Entropy coding, adaptive dictionary algorithms such as LZW—used in GIF and TIFF and deflation—used in PNG, MNG and TIFF. Examples of methods for lossy compression include reducing the color space of a picture 201 to the most common colors in the image, Chroma subsampling, transform coding, and fractal compression.

In color space reduction, the selected colors may be specified in the color palette in the header of the compressed image. Each pixel just references the index of a color in the color palette. This method can be combined with dithering to avoid posterization. Chroma subsampling takes advantage of the fact that the eye perceives brightness more sharply than color, by dropping half or more of the chrominance information in the image. Transform coding is perhaps the most commonly used image compression method. Transform coding typically applies a Fourier-related transform such as a discrete cosine transform (DCT) or the wavelet transform, followed by quantization and entropy coding. Fractal compression relies on the fact that in certain images, parts of the image resemble other parts of the same image. Fractal algorithms convert these parts, or more precisely, geometric shapes into mathematical data called "fractal codes" which are used to recreate the encoded image.

The image compression 204 may include region of interest coding in which certain parts of the image 201 are encoded with higher quality than others. This can be combined with scalability, which involves encoding certain parts of an image first and others later. Compressed data can contain information about the image (sometimes referred to as meta information or metadata) which can be used to categorize, search or browse images. Such information can include color and texture statistics, small preview images and author/copyright information.

By way of example, and not by way of limitation, during image compression at 204 the encoder may search for the best way to compress a block of pixels. The encoder can search all of the reference pictures in the reference picture list 203, including the currently padded picture, for a good match. If the current picture is coded as an intra picture, only the padded picture is available in the reference list. The image compression at 204 produces a motion vector MV and transform coefficients 207 that are subsequently used along with one or more of the reference pictures (including the padded picture) during motion compensation at 206.

The image compression 204 generally includes a motion search MS for a best inter prediction match, an intra search IS for a best intra prediction match, an inter/intra comparison C to decide whether the current macroblock is inter-coded or intra-coded, a subtraction S of the original input pixels from the section being encoded with best match predicted pixels to calculate lossless residual pixels 205. The residual pixels then undergo a transform and quantization XQ to produce transform coefficients 207. The transform is typically based on a Fourier transform, such as a discrete cosine transform (DCT). For existing video standards, if an intra picture is to be coded, the motion search MS and inter/intra comparison C are turned off. However, in embodiments of the present invention, since the padded picture is available as a reference, these functions are not turned off. Consequently, the image compression 204 is the same for intra-coded pictures and inter-coded pictures.

The motion search MS may generate a motion vector MV by searching the picture 201 for a best matching block or macroblock for motion compensation as is normally done for an inter-coded picture. If the current picture 201 is an intra-coded picture, by contrast, existing codecs typically do not allow prediction across pictures. Instead all motion compensation is normally turned off for an intra picture and the picture coded by generating transform coefficients and performing pixel prediction. In embodiments of the present invention, however, an intra picture may be used to do inter prediction by matching a section in the current picture to another offset section within that same picture. The offset between the two sections may be coded as a motion vector MV' that can be used that for motion compensation at 206. By way of example, the encoder may attempt to match a block or macroblock in an intra picture with some other offset section in the same picture then code the offset between the two as a motion vector. The codec's ordinary motion vector compensation for an "inter" picture may then be used to do motion vector compensation on an "intra" picture. Certain existing codecs have functions that can convert an offset between two blocks or macroblocks into a motion vector, which can be followed to do motion compensation at 206. However, these functions are conventionally turned off for encoding of intra pictures. In embodiments of the present invention, the codec may be instructed not to turn off such "inter" picture functions for encoding of intra pictures.

As used herein, motion compensation refers to a technique for describing a picture in terms of the transformation of a reference image to a currently processing image. In general, the motion compensation 206 acts as a local decoder within the encoder implementing the encoding process 200. Specifically, the motion compensation 206 includes inter prediction $IP_1$ and (optionally) intra prediction $IP_2$ to get predicted pixels PP using the motion vector MV or MV' from the image compression 204 and reference pixels from a picture in the reference list. Inverse quantization and inverse transformation IQX using the transform coefficients 207 from the image compression 204 produce lossy residual pixels 205L which are added to the predicted pixels PP to generate decoded pixels 209. The decoded pixels 209 are inserted into the reference picture and are available for use in image compression 204 and motion compensation 206 for a subsequent section of the currently-processing picture 201. After the decoded pixels have been inserted, un-decoded pixels in the reference picture may undergo padding 202.

In a conventional encoder, if the current picture is intra coded, the inter-prediction portions of motion compensation 206 are turned off because there are no other pictures that can be used for motion compensation. However, in embodiments of the present invention, by contrast, motion compensation may be performed on any picture 201 independent of whether a particular picture is to be inter-coded or intra-coded. In embodiments of the present invention, the encoder implementing the method 200 may be modified to add the padded picture to the reference picture list 203 and the inter-prediction portions of the motion compensation 206 are not turned off, even if the currently processing image is to be intra coded. As a result, the process flow for both inter coded sections and intra coded sections is the same during motion compensation 206. The only major difference is the selection of the reference picture to be used for encoding.

By way of example, and not by way of limitation, in one type of motion compensation, known as block motion compensation (BMC), each image may be partitioned into blocks of pixels (e.g. macroblocks of 16×16 pixels). Each block is predicted from a block of equal size in the reference frame. The blocks are not transformed in any way apart from being shifted to the position of the predicted block. This shift is represented by a motion vector MV. To exploit the redundancy between neighboring block vectors, (e.g. for a single moving object covered by multiple blocks) it is common to encode only the difference between a current and previous motion vector in a bit-stream. The result of this differencing process is mathematically equivalent to a global motion compensation capable of panning. Further down the encoding pipeline, the method 200 may optionally use entropy coding 208 to take advantage of the resulting statistical distribution of the motion vectors around the zero vector to reduce the output size.

It is possible to shift a block by a non-integer number of pixels, which is called sub-pixel precision. The in-between pixels are generated by interpolating neighboring pixels. Commonly, half-pixel or quarter pixel precision is used. The computational expense of sub-pixel precision is much higher due to the extra processing required for interpolation and on the encoder side, a much greater number of potential source blocks to be evaluated.

Block motion compensation divides up a currently encoding image into non-overlapping blocks, and computes a motion compensation vector that indicates where those blocks come from in a reference image. The reference blocks typically overlap in the source frame. Some video compression algorithms assemble the current image out of pieces of several different reference images in the reference image list 203.

Figure 2B:
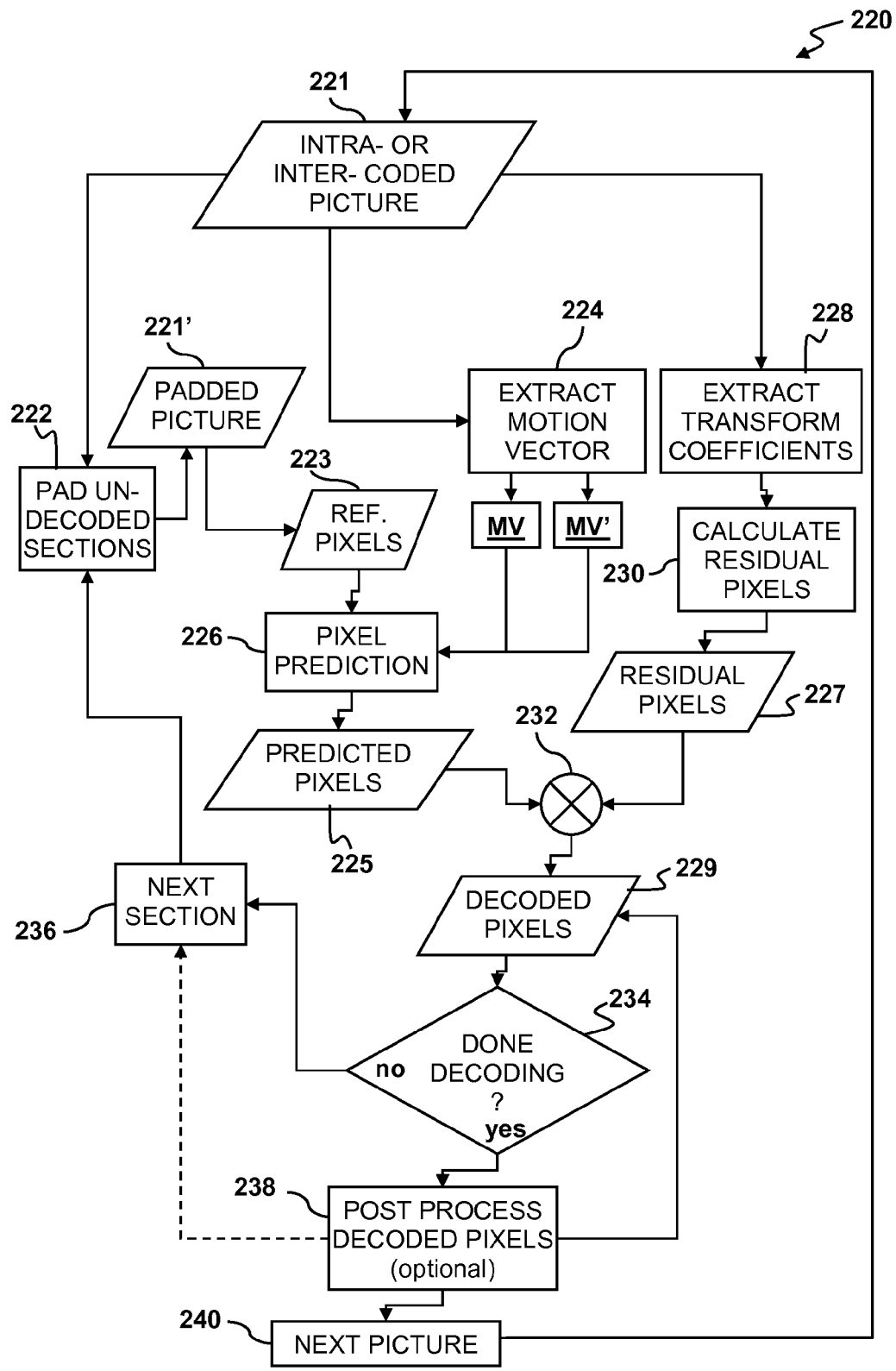
FIG. 2B is a flow diagram illustrating digital picture decoding that may be used in conjunction with embodiments of the present invention.

The result of the padding 202, image compression 204 and motion compensation 206 and (optionally) entropy coding 208 is a coded picture 211. The motion vector MV, (and/or intra prediction mode motion vector MV') and transform coefficients 207 may be included in the coded picture 211. Once a picture has undergone encoding as shown in FIG. 2A, it may be transmitted and then decoded in accordance with another embodiment of the present invention. Picture decoding in association with embodiments of the present invention may proceed in accordance with a method 220 as illustrated in FIG. 2B. As indicated at 222, an un-decoded portion of the picture may be padded to produce a padded picture 221', e.g., as described in commonly-assigned co-pending U.S. patent application Ser. No. 12/210,925, which is incorporated herein by reference. If the current picture 221 has been encoded as described above with respect to FIG. 2A, a motion vector MV (or intra mode motion vector MV') may be extracted from the current picture 221 at 224, independent of whether the current picture is inter-coded or intra-coded.

It is noted that in most codecs, an inter picture could be encoded using both inter mode and intra mode functions. An intra picture, by contrast could only be encoded using the intra mode functions. In certain embodiments of the present invention both inter mode and intra mode functions may be allowed for each individual macroblock inside an intra picture. As a result, the same data flow is used for both intra pictures and inter pictures. The advantage of this may be understood if one considers video encoding or decoding as a stage in a video processing pipeline. If encoding or decoding of intra and inter pictures use the same process and consume the same number of cycles, the whole pipeline will be smoother.

Once the motion vector MV (or MV') has been extracted, it may be used for pixel prediction 226 of an un-decoded section of the current picture 221 to generate predicted pixels 225. The pixel prediction 226 may use reference pixels 223 from the padded picture 221' as reference pixels 223. The reference pixels 223 may come from un-padded portions of the padded picture 221'. In addition, pixels obtained in the padding process 222 may also be used as reference pixels 223. The pixel prediction 226 may include both inter-prediction and intra-prediction for both inter-coded pictures and intra-coded pictures. In particular, the pixel prediction 226 may use a conventional inter mode motion vector MV or an intra mode motion vector MV' generated as described above. In conjunction with pixel prediction at 226, the decoder implementing the decoding method 220 may extract transform coefficients from the current picture 221 as indicated at 228 and calculate residual pixels 227 from the transform coefficients as indicated at 230. The predicted pixels 225 and residual pixels 227 may be combined, as indicated at 232, e.g., by simple addition, to produce decoded pixels 229.

If, at 234, decoding is not finished, decoding proceeds for the next portion of the current picture 221, as indicated at 236. Once decoding is finished, post processing may be performed on the decoded pixels 229 as indicted at 238. Examples of post processing include, but are not limited to de-blocking, natural noise reduction, coding error noise reduction, color enhancement, color space conversion, interlace progressive conversion, frame rate conversion, picture size scaling, alpha blending and 3-D object wrapping. Post processing is typically done on a section if it is far enough away from a currently processing section so that it will not be used as a source of reference pixels. Determining whether a section will be used for pixel prediction may be part of the decision at 234. Once post processing is finished for all pixels, the foregoing process may be repeated for another picture, as indicated at 240.

It is noted that the nature of the decision at 234 as to whether decoding is finished depends on whether current picture pixels are used as reference pixels before or after post processing. To achieve the best prediction it is preferable to use the current picture pixels after post processing. In such a case post processing of the pixels from the current section may take place after pixel prediction for the current section and before pixel prediction for the next section. However, to achieve the simplest implementation it is preferable to use pre-post processing pixels as reference pixels since otherwise the post processed current picture pixels would have to be fed back to each macroblock before decoding the next macroblock. In such a case, decoding of the next section may begin after the pixel prediction for the current section has been completed but before post processing of the pixels for the current section.

In a preferred embodiment, pre-post-processing pixels are used as reference pixels for same picture macroblock inter prediction. In such a case, the padding pixels may be copied from de-coded macroblocks that have not yet undergone post-processing, such as de-blocking.

In some cases, for example, intra-coded pictures and inter-coded pictures containing computer generated artificial content, using portions of the current picture as a source of reference pixels may yield a better prediction than any other prediction mode. But, according to all existing video coding standards, using the current picture as a reference is not allowed for intra-coded pictures. This may not be an obvious solution for camera-captured natural scenes or low resolution pictures, since it is less likely to have the best prediction from the current picture. However, it still benefits from the advantages of simplified process flow for both inter- and intra-coded pictures.

As discussed above, embodiments of the present invention may also be implemented by a device having a video decoder. Specifically, such a device may receive a stream of coded pictures. The stream may contain coded P-frames and a few coded I-frames or none at all. If it is desired to implement VCR-like functionality or error resiliency that requires an I-frame, the device can generate a synthetic I-frame, e.g., a patch frame, as discussed above with respect to FIG. 1C-1F and insert the. The patch frame can then be inserted into the received stream of coded pictures and used for decoding.

Figure 3:
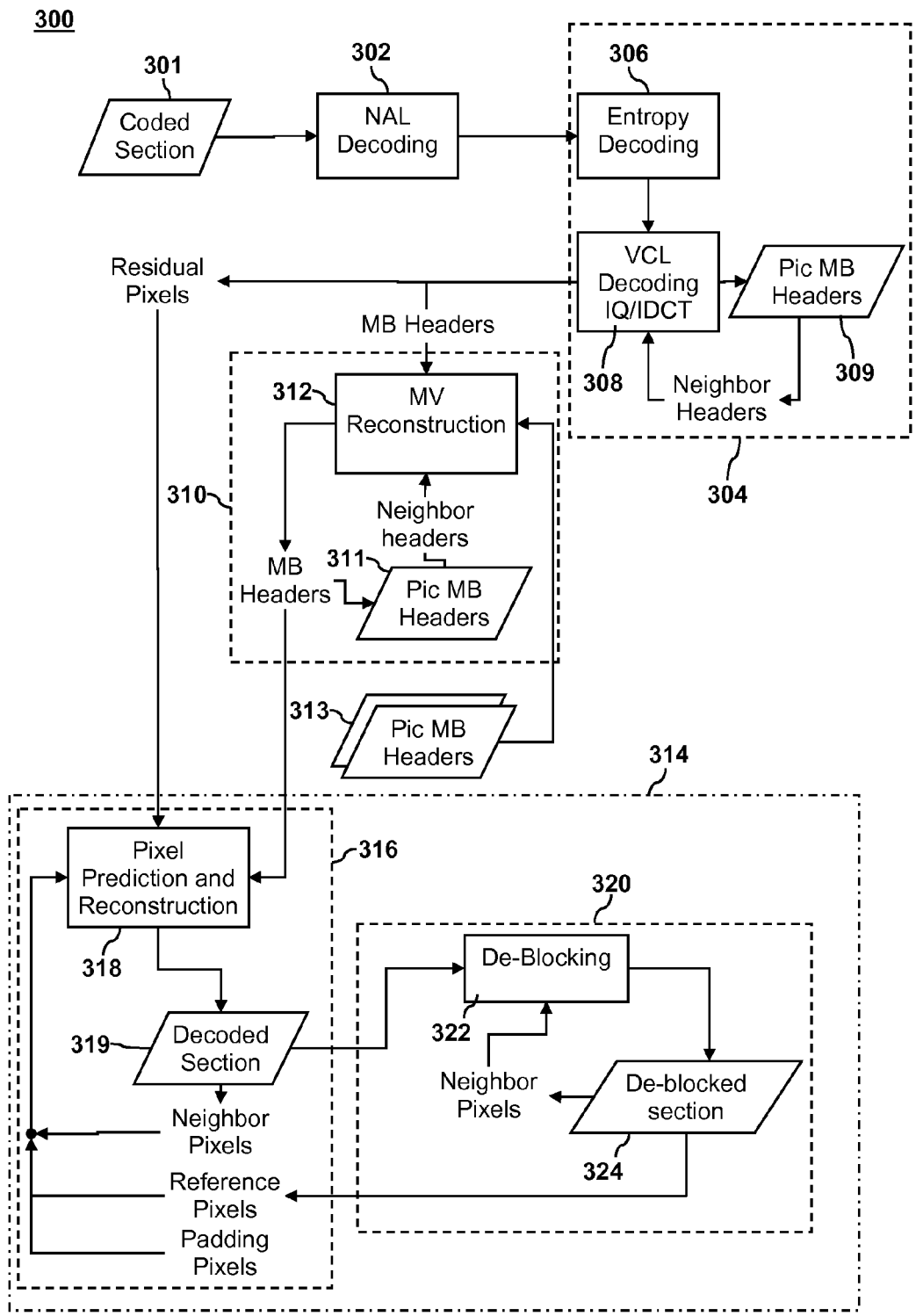
FIG. 3 is a flow diagram illustrating the general process flow in streaming data decoding that may be used in conjunction with embodiments of the present invention.

FIG. 3 illustrates an example of a possible process flow in a method 300 for decoding of streaming data 301 that may be used in conjunction with embodiments of the present invention. This particular example shows the process flow for video decoding, e.g., using the AVC (H.264) standard. The coded streaming data 301 may initially be stored in a buffer. Where coded streaming data 301 (e.g., a video data bitstream) has been transferred over a network, e.g., the Internet, the data 301 may initially undergo a process referred to as network abstraction layer (NAL) decoding, indicated at 302. NAL decoding may remove from the data 301 information added to assist in transmitting the data. Such information, referred to as a "network wrapper" may identify the data 301 as video data or indicate a beginning or end of a bitstream, bits for alignment of data, and/or metadata about the video data itself. Such metadata may include a bit in a header that identifies a particular coded frame as the first coded frame in a sequence of two or more consecutive successive frames that contain intra-coded subsections that can be used to form a patch frame.

In addition, by way of example, the network wrapper may include information about the data 301 including, e.g., resolution, picture display format, color palette transform matrix for displaying the data, information on the number of bits in each picture, slice or macroblock, as well as information used in lower level decoding, e.g., data indicating the beginning or ending of a slice. This information may be used to determine the number of macroblocks to pass to each of the task groups in a single section.

Due to its complexity, NAL decoding is typically done on a picture and slice level. The smallest NAL buffer used for NAL decoding is usually slice sized. Fortunately, the NAL decoding process 302 involves a relatively low number of cycles. Consequently, the NAL decoding process 302 may be done on a single processor.

In some embodiments, after NAL decoding at 302, the remaining decoding illustrated in FIG. 3 may be implemented in three different thread groups or task groups referred to herein as video coded layer (VCL) decoding 304, motion vector (MV) reconstruction 310 and picture reconstruction 314. The picture reconstruction task group 314 may include pixel prediction and reconstruction 316 and post processing 320. In some embodiments of the present invention, these tasks groups may be chosen based on data dependencies such that each task group may complete its processing of all the macroblocks in a picture (e.g., frame or field) or section before the macroblocks are sent to the next task group for subsequent processing.

Certain codecs may use a form of data compression that involves transformation of the pixel information from a spatial domain to a frequency domain. One such transform, among others, is known as a discrete cosine transform (DCT). The decoding process for such compressed data involves the inverse transformation from the frequency domain back to the spatial domain. In the case of data compressed using DCT, the inverse process is known as inverse discrete cosine transformation (IDCT). The transformed data is sometimes quantized to reduce the number of bits used to represent numbers in the discrete transformed data. For example, numbers 1, 2, 3 may all be mapped to 2 and numbers 4, 5, 6 may all be mapped to 5. To decompress the data a process known as inverse quantization (IQ) is used before performing the inverse transform from the frequency domain to the spatial domain. The data dependencies for the VCL IQ/IDCT decoding process 304 are typically at the macroblock level for macroblocks within the same slice. Consequently results produced by the VCL decoding process 304 may be buffered at the macroblock level.

VCL decoding 304 often includes a process referred to as Entropy Decoding 306, which is used to decode the VCL syntax. Many codecs, such as AVC(H.264), use a layer of encoding referred to as entropy encoding. Entropy encoding is a coding scheme that assigns codes to signals so as to match code lengths with the probabilities of the signals. Typically, entropy encoders are used to compress data by replacing symbols represented by equal-length codes with symbols represented by codes proportional to the negative logarithm of the probability. AVC(H.264) supports two entropy encoding schemes, Context Adaptive Variable Length Coding (CAVLC) and Context Adaptive Binary Arithmetic Coding (CABAC). Since CABAC tends to offer about 10% more compression than CAVLC, CABAC is favored by many video encoders in generating AVC(H.264) bitstreams. Decoding the entropy layer of AVC(H.264)-coded data streams can be computationally intensive and may present challenges for devices that decode AVC(H.264)-coded bitstreams using general purpose microprocessors. To decode high bit-rate streams targeted by the Blu-ray or the HD-DVD standards, the hardware needs to be very fast and complex, and the overall system cost could be really high. One common solution to this problem is to design special hardware for CABAC decoding. Alternatively, entropy decoding may be implemented in software. An example of a software implementation of entropy decoding may be found in co-pending U.S. Provisional Patent Application No. 60/823,620, to Xun Xu, filed Aug. 25, 2006 and entitled "ENTROPY DECODING METHODS AND APPARATUS", which is incorporated herein by reference.

In addition to Entropy Decoding 306, the VCL decoding process 304 may involve inverse quantization (IQ) and/or inverse discrete cosine transformation (IDCT) as indicated at 308. These processes may decode the headers 309 and data from macroblocks. The decoded headers 309 may be used to assist in VCL decoding of neighboring macroblocks.

VCL decoding 304 may be implemented at a macroblock level data dependency frequency. Specifically, different macroblocks within the same slice may undergo VCL decoding in parallel and the results may be sent to the motion vector reconstruction task group 310 for further processing.

Subsequently, all macroblocks in the picture or section may undergo motion vector reconstruction 310. The MV reconstruction process 310 may involve motion vector reconstruction 312 using headers from a given macroblock 311 and/or co-located macroblock headers 313. A motion vector describes apparent motion within a picture. Such motion vectors allow reconstruction of a picture (or portion thereof) based on knowledge of the pixels of a prior picture and the relative motion of those pixels from picture to picture. Once the motion vector has been recovered pixels may be reconstructed at 316 using a process based on residual pixels from the VCL decoding process 304 and motion vectors from the MV reconstruction process 310. The data dependency frequency (and level of parallelism) for the MV depends on whether the MV reconstruction process 310 involves co-located macroblocks from other pictures. For MV reconstruction not involving co-located MB headers from other pictures the MV reconstruction process 310 may be implemented in parallel at the slice level or picture level. For MV reconstruction involving co-located MB headers the data dependency frequency is at the picture level and the MV reconstruction process 310 may be implemented with parallelism at the slice level.

The results of motion vector reconstruction 310 are sent to the picture reconstruction task group 314, which may be parallelized on a picture frequency level. Within the picture reconstruction task group 314 all macroblocks in the picture or section may undergo pixel prediction and reconstruction 316 in conjunction with de-blocking 320. The pixel prediction and reconstruction task 316 and the de-blocking task 320 may be parallelized to enhance the efficiency of decoding. These tasks may be parallelized within the picture reconstruction task group 314 at a macroblock level based on data dependencies. For example, pixel prediction and reconstruction 316 may be performed on one macroblock and followed by de-blocking 320. Reference pixels from the decoded picture obtained by de-blocking 320 may be used in pixel prediction and reconstruction 316 on subsequent macroblocks. Pixel prediction and reconstruction 318 produces decoded sections 319 (e.g. decoded blocks or macroblocks) that include neighbor pixels which may be used as inputs to the pixel prediction and reconstruction process 318 for a subsequent macroblock. The data dependencies for pixel prediction and reconstruction 316 allow for a certain degree of parallel processing at the macroblock level for macroblocks in the same slice.

In embodiments of the present invention, pixel prediction may use pixels from within the current picture that is being decoded as reference pixels instead of pixels from an already decoded picture. Any reference pixels that have not been decoded may be replaced by padding pixels, which may be determined from pixels within the current picture that have already been decoded. If no pixels have been decoded, the values of the padding pixels may be determined arbitrarily as discussed above.

The post processing task group 320 may include a de-blocking filter 322 that is applied to blocks in the decoded section 319 to improve visual quality and prediction performance by smoothing the sharp edges which can form between blocks when block coding techniques are used. The de-blocking filter 322 may be used to improve the appearance of the resulting de-blocked sections 324.

The decoded section 319 or de-blocked sections 324 may provide neighboring pixels for use in de-blocking a neighboring macroblock. In addition, decoded sections 319 including sections from a currently decoding picture may provide reference pixels for pixel prediction and reconstruction 318 for subsequent macroblocks. It is during this stage that pixels from within the current picture may optionally be used for pixel prediction within that same current picture as described above, independent of whether the picture (or subsections thereof) is inter-coded or intra-coded. De-blocking 320 may be parallelized on a macroblock level for macroblocks in the same picture.

The decoded sections 319 produced before post processing 320 and the post-processed sections 324 may be stored in the same buffer, e.g., the output picture buffer depending on the particular codec involved. It is noted that de-blocking is a post processing filter in H.264. Because H.264 uses pre-de-blocking macroblock as reference for neighboring macroblocks intra prediction and post-de-blocking macroblocks for future picture macroblocks inter prediction. Because both pre- and post-de-blocking pixels are used for prediction, the decoder or encoder has to buffer both pre-de-blocking macroblocks and post-de-blocking macroblocks. For most low cost consumer applications, pre-de-blocked pictures and post-de-blocked pictures share the same buffer to reduce memory usage. For standards that pre-date H.264, such as MPEG2 or MPEG4 except MPEG4 part 10, (note: H.264 is also called MPEG4 part 10), only pre-post-processing macroblocks (e.g., pre-de-blocking macroblocks) are used as reference for other macroblock prediction. In such codecs, a pre-filtered picture may not share the same buffer with a post filtered picture.

Thus, for H.264, after pixel decoding, the decoded section 319 is saved in the output picture buffer. Later, the post processed sections 324 replace the decoded sections 319 in the output picture buffer. For non-H.264 cases, the decoder only saves decoded sections 319 in the output picture buffer.

The post processing is done at display time and the post processing output may not share the same buffer as the decoder output picture buffer.

For most multi-processor hardware platforms, the inter processor data access delay is shorter than the time interval between video pictures. However, only a few parallel processing engines can do inter-processor data transfer faster than the macroblock processing speed. It is acceptable to have two tasks exchange data at the picture frequency. Based on the picture frequency dependencies described above with respect to FIG. 3, it is possible to break up the decoding process 300 into five separate tasks. These tasks are A) NAL decoding 302 and decoder internal management, B) VCL syntax decoding and IQ/IDCT 304, C) motion vector reconstruction 310 and D) pixel prediction and reconstruction 316 and E) de-blocking 320.

In general, NAL decoding may be done at a picture or slice level data dependency frequency. For codecs such as AVC (H.264) the data dependencies involved in NAL decoding 302 may be fairly complex yet the overall NAL decoding process 302 may take a relatively low number of cycles. Consequently it may be more efficient to implement all NAL decoding 302 on a single processor rather than to attempt to parallelize this process. The motion vector reconstruction task 310 typically takes about one tenth as many processor cycles as for VCL syntax decoding and IQ/IDCT 304, pixel prediction and reconstruction 316 and de-blocking 320. The computational complexities of the latter three tasks are fairly similar. However, the execution cycle allocation among these three large cycle tasks is different for different coded video streams.

Within the VCL syntax decoding and IQ/IDCT 304 there are only macroblock level data dependencies within each slice. For this task, the slices may be treated as being independent of each other. The motion vector reconstruction task 310 depends on the output of the VCL syntax decoding and IQ/IDCT 304 for input. The pixel prediction and reconstruction task 316 takes the outputs of the VCL syntax decoding and IQ/IDCT task 304 and motion vector reconstruction task 310 as inputs. Within the motion vector reconstruction task 310 and pixel prediction and reconstruction task 318 there are macroblock level data dependencies, but slices within one picture are independent of each other.

The pixel prediction and reconstruction task 316 may involve motion compensation. The picture dependency in the pixel prediction and reconstruction task 316 may result from such motion compensation. As discussed above, motion compensation is a process that normally uses a previously decoded picture to predict the current picture. In the motion compensation process, a two-dimensional vector, called a motion vector, is used to reference the pixels in a previously decoded picture. The picture level dependency in the motion vector reconstruction task 310 is caused by direct prediction. In direct prediction, a previously decoded macroblock's motion vector is used to calculate the current macroblock's motion vector. Although conventionally, the referenced macroblock is in a previously decoded reference picture at the same position of the current macroblock. In embodiments of the present invention, by contrast, a section, (e.g., a block or macroblock) within the current picture is used as the reference.

In an AVC decoder, the previously decoded reference picture is the output of the de-blocking task 320. Because of limitations on motion vector ranges defined by the coding standard, not all the pixels in the previous picture may be available to predict a certain macroblock in the current picture. For example, the motion vector range for an AVC level 4.1 stream is −512 to 511.75 pixels vertically and −1024 to 1023.75 pixels horizontally. If the picture size is 1920×1088 pixels, about one quarter of the pixels in the reference picture can be used for prediction of a corner macroblock. By contrast, almost all of the pixels in the reference picture can be used for prediction of a center macroblock.

Note that in the example depicted in FIG. 3, there is no dependency loop between the VCL decoding and IQ/IDCT task 308 and any other tasks. As such, this task may be merged into any or all of the VCL decoding task 304, motion vector reconstruction task 310 or pixel prediction and reconstruction task 316 to balance the task loads amongst available processors. Because some blocks may not have DCT coefficients, merging the IQ/IDCT task 308 into the block syntax decoding loop can allow the decoder to do IQ/IDCT only for coded blocks and reduce the number of branches.

The decoding method described above with respect to FIG. 3 may be implemented in a single thread. Alternatively, the decoding method of FIG. 3 may be implemented in multiple threads with a processing module capable of implementing parallel processing. In particular, different sections of a picture may be processed in parallel. As used herein, processing in parallel means that, to some extent, the processing of two or more different tasks overlaps in time. Table I below gives an example of how the different task groups of FIG. 3 may be processed in parallel on four different sections of a picture over the course of six intervals of time. Each section may be processed with a different processor.

TABLE I

| Int | SECTION 1 | SECTION 2 | SECTION 3 | SECTION 4 |
|---|---|---|---|---|
| 1 | VCL DECODING | | | |
| 2 | MV RECONSTRUCTION | VCL DECODING | | |
| 3 | PICTURE RECONSTRUCTION | MV RECONSTRUCTION | VCL DECODING | |
| 4 | | PICTURE RECONSTRUCTION | MV RECONSTRUCTION | VCL DECODING |
| 5 | | | PICTURE RECONSTRUCTION | MV RECONSTRUCTION |
| 6 | | | | PICTURE RECONSTRUCTION |

It is noted that other parts of the decoding process, such as NAL decoding 302 may be implemented in parallel with VCL decoding 304, Motion Vector reconstruction 310 and Picture Reconstruction 314 using the type of "staggered" illustrated in Table I. Such parallel processing may be implemented with a processing module capable of implementing parallel processing.

In a particular embodiment, multi-threaded decoding may be implemented by dividing the process of decoding a digital picture into two or more tasks based on data dependencies between the two or more tasks. The two or more tasks may be executed in parallel on three or more processors in a way that balances a processing load of executing the two or more tasks among the three or more processors. Details and examples of such multi-threaded decoding, including apparatus for implementing multi-threaded decoding, are described, e.g., in U.S. patent application Ser. No. 11/867,627 and U.S. Provisional Patent Application No. 60/863,767, both of which have been incorporated herein by reference.

Once a patch frame has been formed it may be inserted into a buffer for display.

Figure 4:
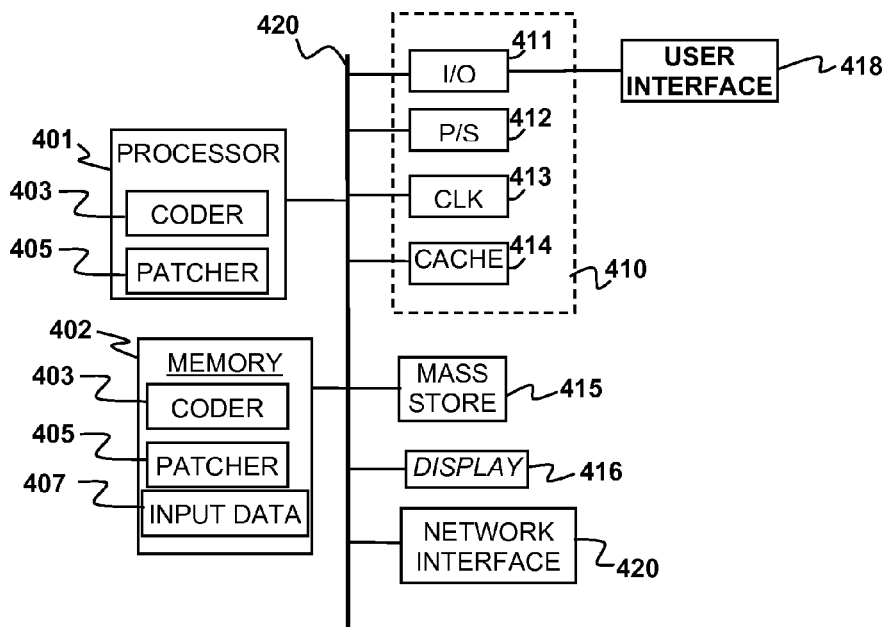
FIG. 4 is a block diagram illustrating an apparatus for encoding and/or decoding a digital picture according to an embodiment of the present invention.

FIG. 4 illustrates a block diagram of a computer apparatus 400 that may be used to implement picture decoding as described above. The apparatus 400 may include a processor module 401 and a memory 402. The processor module 401 may include one or more processor cores. As an example of a processing system that uses multiple processor modules, is a Cell processor, examples of which are described in detail, e.g., in Cell Broadband Engine Architecture, which is available online at http://www-306.ibm.com/chips/techlib/techlib.nsf/techdocs/1AEEE1270EA2776387257060006E61BA/$file/CBEA_0_1_pub.pdf, which is incorporated herein by reference.

The memory 402 may be in the form of an integrated circuit, e.g., RAM, DRAM, ROM, and the like). The memory may also be a main memory that is accessible by all of the processor modules 401. In some embodiments, the processor module 401 may have local memories associated with each core. A coder program 403 may be stored in the main memory 402 in the form of processor readable instructions that can be executed on the processor modules 401. The coder program 403 may be configured to encode a picture into compressed signal data, e.g., as described above with respect to FIG. 2A and/or to decode compressed signal data, e.g., as described above with respect to FIG. 2B and FIG. 3. The coder program 403 may be written in any suitable processor readable language, e.g., e.g., C, C++, JAVA, Assembly, MATLAB, FORTRAN and a number of other languages. A patcher program 405 may also be stored in memory 402 for execution on the processor 401. The patcher program 405 includes instructions that, when executed, cause the system to form a patch frame for use as a synthetic random access point, e.g., as discussed above with respect to FIG. 1F. Specifically, execution of the patcher program 405 may cause the apparatus 400 to a) copy one or more intra-coded subsections from different portions of two or more different predictive-coded frames in a stream; and b) form a patch frame from the copied intra-coded subsections. In some implementations, the patcher program 405 may be implemented as part of the coder program 403.

Input data 407 may be stored in the memory 402. Such input data may include buffered portions of a streaming data, e.g., encoded video pictures or portions thereof. During execution of the coder program 403, portions of program code and/or data 407 may be loaded into the memory 402 or the local stores of processor cores for parallel processing by multiple processor cores. By way of example, and not by way of limitation, the input data 407 may include digital video pictures, or sections thereof, before or after encoding or decoding or at intermediate stages of encoding or decoding. In the case of decoding, the input data may include un-decoded sections, sections that have been decoded, but not post-processed and sections that have been decoded and post processed. These various sections may be stored in one or more buffers. In particular, decoded and/or post processed sections may be stored in an output picture buffer implemented in the memory 402.

The apparatus 400 may also include well-known support functions 410, such as input/output (I/O) elements 411, power supplies (P/S) 412, a clock (CLK) 413 and cache 414. The apparatus 400 may optionally include a mass storage device 415 such as a disk drive, CD-ROM drive, tape drive, or the like to store programs and/or data. The device 400 may also optionally include a display unit 416 and user interface unit 418 to facilitate interaction between the apparatus 400 and a user. The display unit 416 may be in the form of a cathode ray tube (CRT) or flat panel screen that displays text, numerals, graphical symbols or images. The user interface 418 may include a keyboard, mouse, joystick, light pen or other device that may be used in conjunction with a graphical user interface (GUI). The apparatus 400 may also include a network interface 420 to enable the device to communicate with other devices over a network, such as the internet. These components may be implemented in hardware, software or firmware or some combination of two or more of these.

Figure 5:
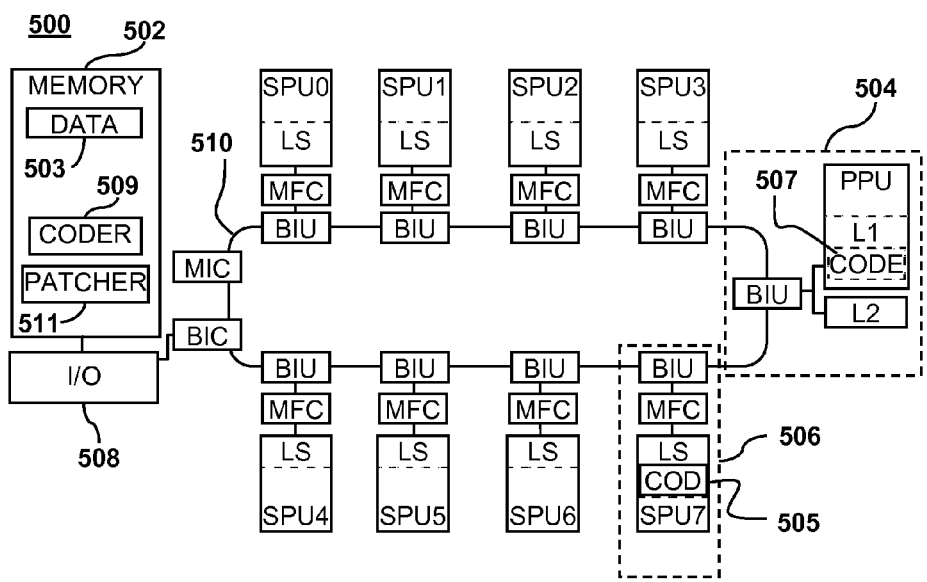
FIG. 5 is a block diagram illustrating an example of a cell processor implementation of an apparatus for encoding and/or decoding a digital picture according to an embodiment of the present invention.

One example, among others of a processing system capable of implementing parallel processing on three or more processors is a cell processor. There are a number of different processor architectures that may be categorized as cell processors. By way of example, and without limitation, FIG. 5 illustrates a type of cell processor 500. The cell processor 500 includes a main memory 502, a single power processor element (PPE) 504 and eight synergistic processor elements (SPE) 506. Alternatively, the cell processor 500 may be configured with any number of SPE's. With respect to FIG. 5, the memory 502, PPE 504, and SPEs 506 can communicate with each other and with an I/O device 508 over a ring-type element interconnect bus 510. The memory 502 contains input data 503 having features in common with the input data 407 described above and a coder program 509 having features in common with the coder program 403 described above. The memory 502 may also contain a patcher program 511 having features in common with the patcher program 405 described above. At least one of the SPE 506 may include in its local store (LS) decoding instructions 505 and/or a portion of the buffered input data that is to be processed in parallel, e.g., as described above. The PPE may include in its L1 cache, code instructions 507 having features in common with the coder program 403 described above. Instructions 505 and data 507 may also be stored in memory 502 for access by the SPE and PPE when needed.

By way of example the PPE 504 may be 64-bit PowerPC Processor Unit (PPU) with associated caches. The PPE 504 may include an optional vector multimedia extension unit. Each SPE 506 includes a synergistic processor unit (SPU) and a local store (LS). In some implementations, the local store may have a capacity of e.g., about 256 kilobytes of memory for code and data. The SPUs are less complex computational units than PPU, in that they typically do not perform any system management functions. The SPUs may have a single instruction, multiple data (SIMD) capability and typically process data and initiate any required data transfers (subject to access properties set up by a PPE) in order to perform their allocated tasks. The SPUs allow the system 500 to implement applications that require a higher computational unit density and can effectively use the provided instruction set. A significant number of SPUs 505 in a system, managed by the PPE 504, allows for cost-effective processing over a wide range of applications. By way of example, the cell processor 500 may be characterized by an architecture known as Cell Broadband engine architecture (CBEA). In CBEA-compliant architecture, multiple Peps may be combined into a PPE group and multiple SPEs may be combined into an SPE group. For the purposes of example, the cell processor 500 is depicted as having only a single SPE group and a single PPE group with a single SPE and a single PPE. Alternatively, a cell processor can include multiple groups of power processor elements (PPE groups) and multiple groups of synergistic processor elements (SPE groups). CBEA-compliant processors are described in detail, e.g., in Cell Broadband Engine Architecture, which is available online at: http://www-306.ibm.com/chips/techlib/techlib.nsf/techdocs/1AEEE1270EA2776387257060006E61BA/$file/CBEA_01_pub.pdf, which is incorporated herein by reference.

Embodiments of the invention provide systems and methods for generating and using synthetic random access points in coded video streams. Such embodiments may be applied to most video decoders, in particular, H.264/AVC decoders and, more particularly, to products that have video encoder or decoder as a module. Examples of such products include but are not limited to video game consoles, DVD players, software (PC) video decoder/player, video on cell phones, digital video cameras and the like. In alternative embodiments, such systems and methods may be applied to decoding of streaming data other than video. Examples of such embodiments include systems and methods for decoding streaming audio data, graphic rendering streams, still picture and XML documents. Embodiments of the present invention may be desirable for various applications recording a video game, streaming game images to a portable game device and uploading and sharing game results with multiple game systems connected via a network.

As noted above, embodiments of the invention may be implemented by modifying existing video coding standards to allow a random access point to be generated in coder implementations that would not otherwise allow this.

Although examples have been described above in terms of decoding video images, one may alternatively utilize embodiments of the present invention for decoding still pictures, e.g., in JPEG. To implement this one could add a motion vector computation function to an existing JPEG decoder and modifying the decoder to enable inter prediction and to allow the current picture to be used as a reference picture. Embodiments of this invention can potentially be used in the next generation game console, and/or portable devices.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. Any feature, whether preferred or not, may be combined with any other feature, whether preferred or not. In the claims that follow, the indefinite article "A", or "An" refers to a quantity of one or more of the item following the article, except where expressly stated otherwise. Any element in a claim that does not explicitly state "means for" performing a specified function, is not to be interpreted as a "means" or "step" clause as specified in 35 USC §112, ¶ 6. In particular, the use of "step of" in the claims herein is not intended to invoke the provisions of 35 USC §112, ¶ 6.

The reader's attention is directed to all papers and documents which are filed concurrently with this specification and which are open to public inspection with this specification, and the contents of all such papers and documents incorporated herein by reference.

What is claimed is:

1. A method for generating a random access point from a stream of coded digital pictures containing a plurality of predictive coded frames, the plurality of predictive coded frames having two or more predictive coded frames in which one or more subsections of each of the two or more predictive coded frames are intra coded, the method comprising:
- a) identifying two or more consecutive predictive-coded frames in the stream that each contain one or more intra-coded subsections from different portions with a processor module; and
- b) forming a patch frame by combining the intra-coded subsections from the different portions of the two or more consecutive predictive-coded frames identified in a) into the patch frame with the processor module.

2. The method of claim 1, further comprising c) presenting the patch frame on a display.

3. The method of claim 1 wherein the stream of coded pictures includes no intra-coded frames.

4. The method of claim 1 wherein the one or more subsections include one or more macroblocks.

5. The method of claim 1 wherein the one or more subsections include one or more rows of macroblocks.

6. The method of claim 1 wherein a) is performed by an encoder unit that encodes a sequence of digital pictures to form the stream of coded digital pictures.

7. The method of claim 6 wherein a) includes setting a bit in a header in the stream of coded digital pictures.

8. The method of claim 6, further comprising, after a) and before b), transmitting the stream of coded pictures over a network to a device that contains a decoder, wherein b) is performed by the decoder.

9. The method of claim 1, wherein a) and b) are performed by a decoder unit that decodes the stream of coded pictures to form a sequence of decoded pictures.

10. The method of claim 9 wherein a) includes reading a bit in a header in the stream of coded digital pictures and determining from a value of the bit whether two or more consecutive predictive-coded frames in the stream can be used to form the patch frame.

11. The method of claim 10, further comprising, utilizing the patch frame as a random access point for display of the sequence of decoded pictures.

12. The method of claim 11, wherein utilizing the patch frame includes implementing fast forward or fast reverse in the display of the sequence of decoded pictures.

13. The method of claim 10, further comprising, utilizing the patch frame as a random access point for error resiliency.

14. An apparatus for generating a random access point in a stream of coded digital pictures containing a plurality of predictive coded frames, the plurality of predictive coded frames having two or more predictive coded frames in which one or more subsections of each of the two or more predictive coded frames are intra coded, the apparatus comprising:
- a processor;
- a memory; and
- computer coded instructions embodied in the memory and executable by the processor, wherein the computer coded instructions are configured to implement a method for encoding a digital picture upon execution by the processor, the method comprising:
- a) identifying two or more consecutive predictive-coded frames in the stream that each contain one or more intra-coded subsections from different portions; and
- b) forming a patch frame by combining the intra-coded subsections from the different portions of the two or more consecutive predictive-coded frames identified in a) into the patch frame.

15. The apparatus of claim 14, wherein the method further comprises: c) presenting the patch frame on a display.

16. The apparatus of claim 14, wherein the stream of coded pictures includes no intra-coded frames.

17. The apparatus of claim 14, wherein the one or more subsections include one or more macroblocks.

18. The apparatus of claim 14, wherein the one or more subsections include one or more rows of macroblocks.

19. The apparatus of claim 14, wherein a) and b) are performed by an encoder unit that encodes the digital pictures to form the stream.

20. The apparatus of claim 19, wherein the method further comprises transmitting the stream of coded pictures over a network to a device that contains a decoder.

21. The apparatus of claim 14, wherein a) and b) are performed by a decoder unit that decodes the stream of pictures to form a sequence of decoded pictures.

22. The apparatus of claim 21, further comprising, utilizing the patch frame as a random access point for display of the sequence of decoded pictures.

23. The apparatus of claim 22, wherein utilizing the patch frame includes implementing fast forward or fast reverse in the display of the sequence of decoded pictures.

24. The apparatus of claim 21, further comprising, utilizing the patch frame as a random access point for error resiliency.

25. A non-transitory computer-readable medium having embodied therein coded instructions executable by a computer processor, the computer coded instructions being configured to implement a method for generating a random access point in a stream of coded digital pictures containing a plurality of predictive coded frames, the plurality of predictive coded frames having two or more predictive coded frames in which one or more subsections of each of the two or more predictive coded frames are intra coded, comprising, the method comprising:
- a) identifying two or more consecutive predictive-coded frames in the stream that each contain one or more intra-coded subsections from different portions; and
- b) forming a patch frame by combining the intra-coded subsections from the different portions of the two or more consecutive predictive-coded frames identified in a) into the patch frame.

26. A method for generating a random access point in a stream of coded digital pictures containing a plurality of predictive coded frames, the plurality of predictive coded frames having two or more predictive coded frames in which one or more subsections of each of the two or more predictive coded frames are intra coded, the method comprising:
- a) predictive coding two or more consecutive frames into a stream of digital pictures, wherein each of the two or more different predictive-coded frames contains one or more intra-coded subsections from different portions; and
- b) adding information to the stream, wherein the information identifies for a decoder which of the two or more consecutive predictive-coded frames have intra-coded subsections at different portions which can be combined to form a patch frame.

* * * * *